Figure 1:
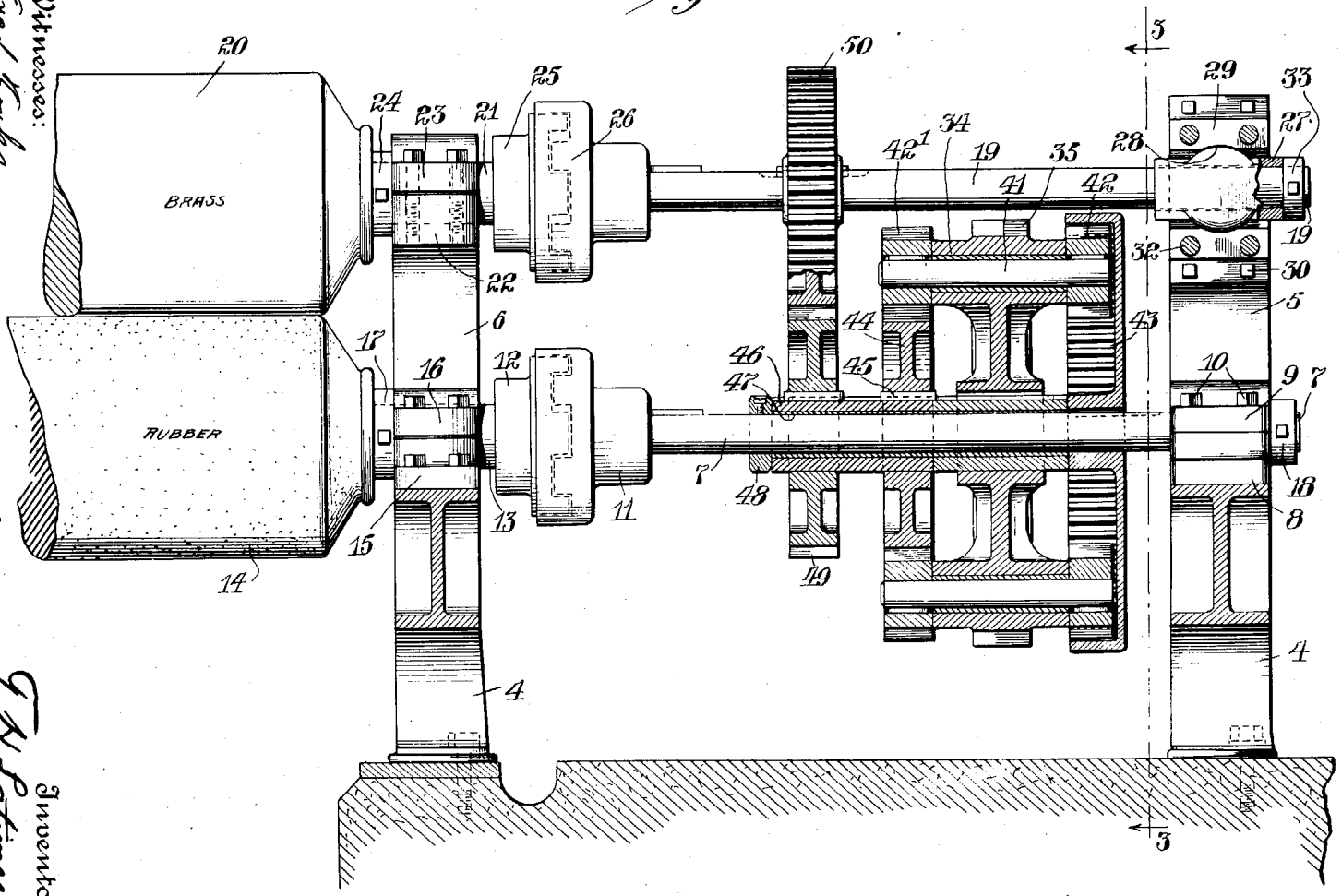

T. H. LATIMER.

COMPENSATING GEAR.

APPLICATION FILED MAR. 10, 1915.

Reissued June 20, 1916.

14,153.

2 SHEETS—SHEET 1.

Witnesses:
Fred Forke
Washington Reiter

Inventor
T. H. Latimer
By his Attorneys
Rogers Kennedy & Campbell.

T. H. LATIMER.

COMPENSATING GEAR.

APPLICATION FILED MAR. 10, 1915.

Reissued June 20, 1916.

14,153.

2 SHEETS—SHEET 2.

Witnesses:

Fred Forke

Washington Reiter

Inventor

By his T. H. Latimer

Attorneys

Rogers Kennedy & Campbell

UNITED STATES PATENT OFFICE.

THOMAS H. LATIMER, OF SARATOGA SPRINGS, NEW YORK.

COMPENSATING GEAR.

14,153. Specification of Reissued Letters Patent. Reissued June 20, 1916.

Original No. 1,055,545, dated March 11, 1913, Serial No. 566,963. Application for reissue filed March 10, 1915. Serial No. 13,540.

*To all whom it may concern:*

Be it known that I, THOMAS H. LATIMER, a citizen of the United States, residing at Saratoga Springs, in the county of Saratoga and State of New York, have invented certain new and useful Improvements in Compensating Gears, of which the following is a specification, reference being had therein to the accompanying drawing.

The present invention is an improvement in compensating gearing, the objects of the invention being to provide a simple economical and durable device of the character described, which will maintain indentical the peripheral speed of a plurality of rolls or other elements, whether the same are of the same or different diameters.

One of the principal applications of the invention is in connection with the manufacture of paper where it is desired to rotate the drive rolls at the same peripheral speed. As is well kown in this particular art, two rolls are usually employed, one of brass and the other of rubber, and between these rolls pass the two endless felts which convey the paper pulp. These rolls not only drive these two large felt carriers, but also act to squeeze or press out the water carried by the felts and the pulp. They are, accordingly quite large and heavy, in order that they may properly perform their functions. Further, the work that they must perform is such that, in a very short time, the rubber roll has become worn so that its diameter is no longer as great as that of the brass roll. Heretofore in devices of this character, the shafts carrying these two rolls were geared together and, when the diameter of one roll became less than that of the other, this gear connection was removed and one roll was driven from the other, the power from the drive roll being transmitted to the other roll through the felt in engagement with the drive roll, the pulp, and the felt in engagement with the driven roll. Transmitting the power from one roll to the other through the pulp very deleteriously affects the latter, and it is one of the particular objects of the present invention to effectively drive these heavy rolls without injuring the pulp, and to always rotate them at the same peripheral speed, notwithstanding any difference in the diameters thereof that may be produced by wear or otherwise. Further, all felts, wires or belts driven by frictional contact from one side thereof only, by a roller or other means, have a certain percentage of slippage which varies according to the work that such belts, wires or felts have to perform. Therefore, by driving these latter from both sides, as is possible by the use of the present invention, the slippage and friction are reduced to a minimum and the life of the belt, wires or felts is accordingly prolonged over what it was under the old method of driving them. In the paper-making art particularly it is well known that the woolen felts employed wear out in a very short time, the nap being rapidly removed by friction; and this friction is greatly reduced, and hence the life of the felt much increased by driving both top and bottom rollers, which is practicable when the peripheral speed of the rollers is maintained identical by my improved automatic controller or compensating gear.

The invention is herein described as particularly applicable to the manufacture of paper, but it will be understood that the claims are not so limited and that the device may be applied to any art or purpose where it is desired to maintain identical the peripheral speed of a plurality of rolls or other elements, for any desired or useful purpose.

The invention will be better understood by reference to the accompanying drawings, wherein—

Figure 2:
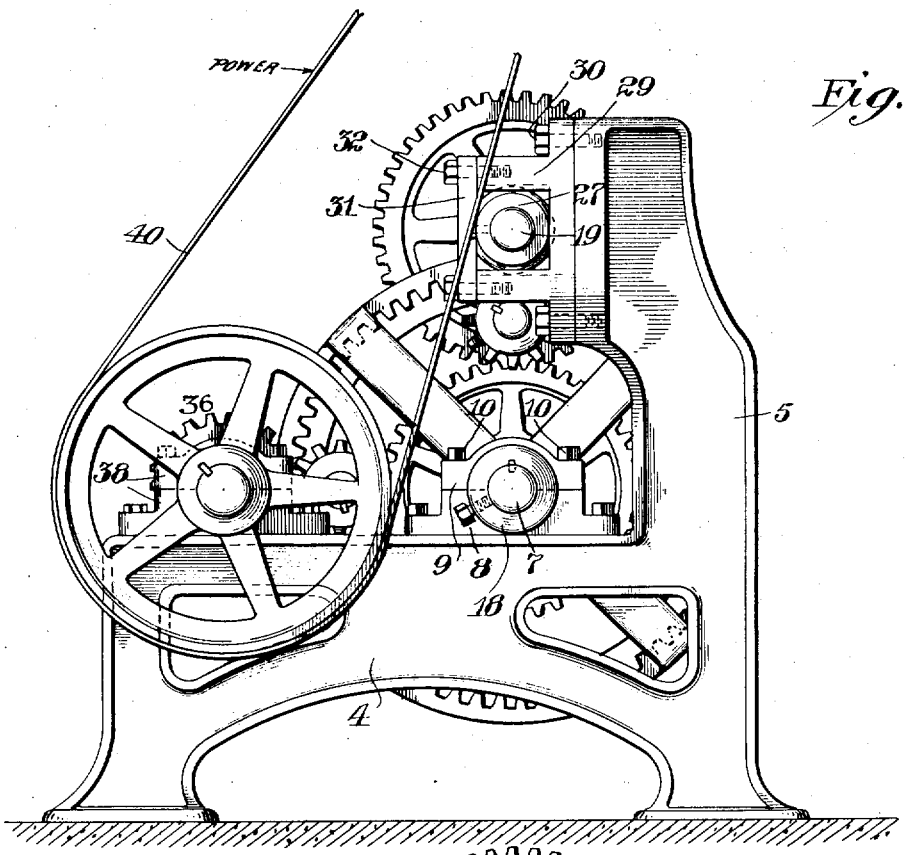
Figure 3:
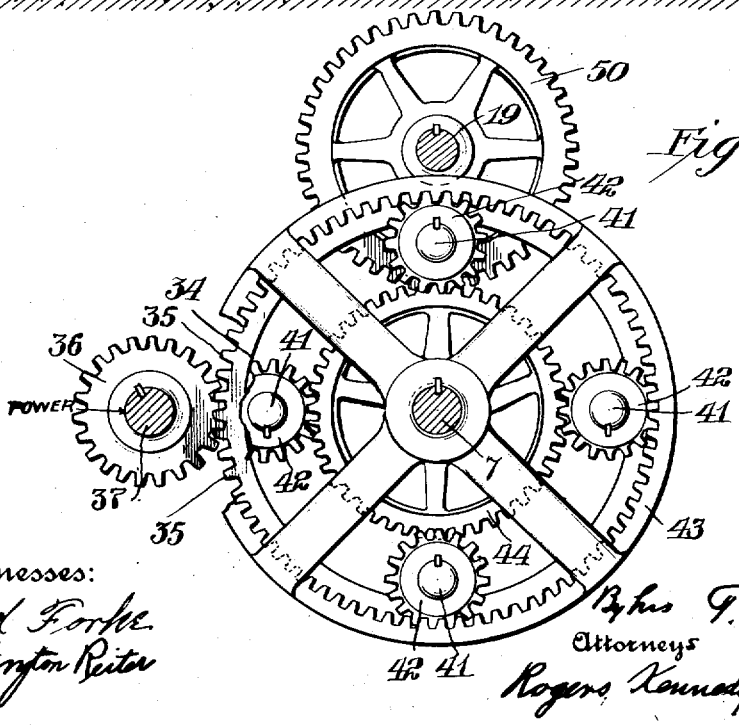

Figure 1 is a longitudinal elevation, partly in section, showing two drive rolls and my improved compensating gear associated therewith; Fig. 2 is a right hand end elevation corresponding to Fig. 1; and Fig. 3 is a side view of part of the gearing, taken on the line 3—3 of Fig. 1.

Referring to the drawings, 4 is a base of any suitable or desired construction and material, provided with upright members 5 and 6. On said base 4 is secured a suitable bearing for one end of a shaft 7. This bearing is preferably in two parts, a base portion 8 and a cap 9, secured together by bolts 10. The other end of said shaft 7 is provided with a clutch member 11 of any suitable or desirable construction, which is engaged by a similar clutch member 12 provided on a shaft 13, on which shaft is mounted a roll 14 of suitable size and material, preferably a rubber roll, or a roll with a rubber surface, being employed. The end portions of shaft 13 are supported in bearings preferably similar to that provided for shaft 7, only the right hand bearing 15, 16, being, however, shown in the drawings. Sleeve 17, keyed to shaft 13, and sleeve 18, keyed to shaft 7, may, if desired, be employed to prevent lengthwise movement of said shafts.

Preferably arranged above shaft 7 and roll 14 and parallel thereto, is another shaft 19 and a roll 20. Roll 20, which is of any suitable material, preferably brass, is carried by a shaft 21 suitably mounted in bearings, similar to those heretofore described. Only the right hand bearing provided on upright 6 is, however, shown. Preferably the base portion 22 of this bearing is an arm integral with upright 6 and projecting therefrom, cap portion 23 being secured thereto, in any suitable manner. Shaft 21 is preferably provided with a collar 24 and with a suitable clutch member 25, which latter engages a similar clutch member 26 mounted on one end of shaft 19. The other end of shaft 19 passes through and rotates within a boxing 27 provided with a bearing surface 28 curved in a vertical plane. Surface 28 engages, preferably, in corresponding depressions in a bearing 29 secured in any desired manner to upright 5, as by bolts 30. A plate 31 secured to boxing 29 by bolts 32 prevents lateral movement of said shaft 19 and boxing 27. It will, however, be appreciated that if cap 23 were removed, roll 20 and shaft 19 could be readily elevated, the curved surface 28 being the pivot point. It is frequently desirable to so elevate the roll 20, as, for example, when it is necessary to change the felts, and for that purpose, to separate the rolls 14 and 20. Shaft 19 may, if desired, be provided with a sleeve 33 which will bear against the end of boxing 27.

Loosely mounted on shaft 7 is a wheel or casing 34 of any suitable or desired construction, which is driven by any suitable means. Preferably, however, it is provided on its periphery with teeth 35 which mesh with driving gear 36, keyed to shaft 37 suitably mounted in bearings 38 (one of which is shown in Fig. 2) arranged on the base 4. Shaft 37 is rotated by any desired means, as by pulley 39 and belt 40, the latter being driven from any suitable source of power.

Mounted in wheel 34 are a plurality of shafts 41 on one end of each of which is mounted a pinion 42 meshing with an internal gear 43 keyed fast to shaft 7, and on the other end a pinion 42′ meshing with an external gear 44, secured by a key 45 to a sleeve 46, which is provided with a bushing 47 and rotates loosely on shaft 7. Wheel 34 rotates loosely on said sleeve. A sleeve 48, fixed to said shaft 7, prevents endwise movement of the sleeve 46 toward the left. There is also keyed, or otherwise suitably secured, to sleeve 46, a gear 49 which meshes with a gear 50 keyed to shaft 19, whereby when said gear 44 is rotated, movement will be imparted to shaft 19 and roll 20. Shaft 7 is rotated directly through the engagement of gear 43 and pinions 42.

The provision of a plurality of shafts 41 (here shown as four) on which driving pinions 42 and 42′ are mounted, results in the application of power to gears 43 and 44 at four different and preferably equally spaced points, with the result that shaft 7 is relieved of side thrust and wear in its bearings, and a much lighter and cheaper shaft may therefore be employed.

The operation of the device is as follows: When the diameters of the rolls are the same, as when the rolls are new, the rotation thereof is effected without relative movement between driving pinions 42 and gear wheel 43, or driving pinions 42′ and gear wheel 44, said pinions being locked with said gears and acting as driving projections. If, however, the diameter of one of the rolls, say 14, becomes smaller, as through wear, it would be necessary for the roll 20 to rotate slower on account of its larger size, and pinions 42′ will thereupon automatically rotate on their axes at a speed such that the rolls 14 and 20 notwithstanding their different diameters, will revolve at the same peripheral speed.

The application of power at the periphery of wheel 34, as heretofore described, permits of practically adjusting the peripheral speed of even such heavy working elements as the drive rolls used in paper making, and the loose mounting of wheel 34 on shaft 7 reduces the number of shafts necessarily employed, inasmuch as shaft 7 may, and is, used as one of the main driving shafts and is connected to roll 14.

While the invention is herein particularly described as applied to two drive rolls, it will be understood that it might be applied to any other rotating elements, the peripheral speed of which it is sought to maintain constant.

By the application of the compensating gear described, to the drive or press rolls, or like work elements in paper making machines, many objections are overcome in the operation of the machine and a superior quality of paper may be produced. This results from the fact that both rolls are driven positively, and notwithstanding any change in diameter which may be caused by wear, the rolls are maintained at the same peripheral speed of rotation. This prevents slippage of the rolls and consequent wear, and the disturbance of the pulp in its passage between the rolls, thereby insuring a more uniform and stronger paper; increased life of the rolls, felts and wire belts; and the saving of time and expense in making repairs, etc. In this connection I believe myself to be the first to apply a driving means for the rotary coöperating rolls in paper making machines, which means will apply a positive driving power to both rolls and maintain their surface speed at the same rate without regard to any change in diameter in the rolls, the said driving means operating automatically in the event of any variation in diameter to restore the same rate of surface speed and maintain said rate.

Having thus described my invention, what I claim is:

1. In a device of the character described, a shaft, an element rotated thereby, a wheel loosely mounted on said shaft, means engaging said wheel at its periphery and rotating the same, a gear fixedly mounted on said shaft on one side of said wheel, a gear loosely mounted on said shaft on the other side of said wheel, a plurality of shafts carried by said wheel, a pinion mounted on one end of each of said shafts and meshing with said fixed gear, and a pinion mounted on the other end of each of said shafts and meshing with said loose gear, a second gear loosely mounted on said first mentioned shaft, a second shaft parallel with said first shaft, an element rotated thereby, and a gear fixedly mounted on said shaft and meshing with said second loose gear whereby said shafts are rotated in opposite directions.

2. In a device of the character described, a shaft, an element rotated thereby, a wheel loosely mounted on said shaft, means engaging said wheel at its periphery and rotating the same, a gear fixedly mounted on said shaft on one side of said wheel, a gear loosely mounted on said shaft on the other side of said wheel, a plurality of shafts carried by said wheel and disposed equidistantly from each other, a pinion mounted on one end of each of said shafts and meshing with said fixed gear, and a pinion mounted on the other end of each of said shafts and meshing with said loose gear, a second gear loosely mounted on said first mentioned shaft, a second shaft parallel with said first shaft, an element rotated thereby, and connections between said second shaft and said second loose gear.

3. In a device of the character described, a shaft, a roll rotated thereby, a sleeve loosely mounted on said shaft, a wheel loosely mounted on said sleeve, means engaging said wheel at its periphery and rotating the same, a plurality of shafts carried by said wheel, a pinion mounted on one end of each of said shafts and meshing with said gear fixed on said first mentioned shaft, and a pinion mounted on the other end of each of said shafts and meshing with the gear fixed on said sleeve, a second gear fixedly mounted on said sleeve, a second shaft parallel with said first shaft, a roll rotated thereby, and a gear fixedly mounted on said shaft and meshing with said second gear fixed to said sleeve whereby said shafts are rotated in opposite directions.

4. In a device of the character described, the combination of a shaft, a wheel sustained thereby and rotatable about an axis coincident with the axis of the shaft, rotary pinions carried by the wheel, an internal gear sustained by the shaft at one side of the wheel, an external gear sustained by the shaft at the other side of the wheel, said gears engaged respectively by said pinions, and being rotatable relatively to each other and relatively to the wheel, an element arranged axially of the said shaft and driven by one of said gears, a second shaft arranged parallel with the first and driven from said other gear, and an element driven from the second shaft.

5. In a device of the character described, the combination of a shaft, a wheel sustained thereby and rotatable about an axis coincident with the axis of the shaft, rotary pinions carried by the wheel, an internal gear sustained by the shaft at one side of the wheel, an external gear sustained by the shaft at the other side of the wheel, said gears engaged respectively by the said pinions, and being rotatable relatively to each other and relatively to the wheel, an element arranged axially of said shaft and driven by the internal gear, a second shaft driven by the external gear, and an element driven by the second shaft.

6. In a paper making machine, the combination of two rotary rolls adapted to receive between them a layer of pulp and to apply a squeezing pressure to the same, driving means for applying a driving power positively to both of said rolls to rotate them at the same peripheral speed, said driving means operating automatically to vary the speed of rotation in accordance with variations in the diameter of a roll; whereby said rolls will be both positively driven, and both at the same peripheral speed without regard to any change in diameter.

7. In a paper making machine, the combination of two rotary rolls adapted to receive between them a layer of pulp and to apply a squeezing pressure to the same, driving means for applying a driving power positively to said rolls to rotate them at the same peripheral speed, said driving means comprising a compensating gearing operating automatically to vary the speed of rotation in accordance with variations in the diameter of a roll; whereby said rolls will both be positively driven, and both at the same peripheral speed without regard to any change in diameter.

In testimony whereof I have signed this specification in the presence of two subscribing witnesses.

THOMAS H. LATIMER.

Witnesses:

F. G. HOWLAND,

COLER R. MCPHERSON.